United States Patent
Tang et al.

(10) Patent No.: US 12,455,767 B2
(45) Date of Patent: Oct. 28, 2025

(54) DATA TRANSFER SCHEDULING FOR HARDWARE ACCELERATOR

(71) Applicant: Microsoft Technology Licensing, LLC, Redmond, WA (US)

(72) Inventors: Monica Man Kay Tang, Santa Clara, CA (US); Ruihua Peng, San Jose, CA (US); Zhuo Ruan, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 48 days.

(21) Appl. No.: 18/490,572

(22) Filed: Oct. 19, 2023

(65) Prior Publication Data

US 2024/0045719 A1 Feb. 8, 2024

Related U.S. Application Data

(63) Continuation of application No. 18/173,257, filed on Feb. 23, 2023, now Pat. No. 11,816,502, which is a
(Continued)

(51) Int. Cl.
G06F 9/48 (2006.01)
G06F 7/24 (2006.01)
(Continued)

(52) U.S. Cl.
CPC .............. G06F 9/4881 (2013.01); G06F 7/24 (2013.01); G06F 9/5027 (2013.01); G06F 9/544 (2013.01)

(58) Field of Classification Search
None
See application file for complete search history.

(56) References Cited

U.S. PATENT DOCUMENTS

2020/0081744 A1* 3/2020 Siegl .................... G06F 9/5061
2022/0237040 A1* 7/2022 Shin ........................ G06N 3/063

FOREIGN PATENT DOCUMENTS

TW 201734758 A 10/2017

OTHER PUBLICATIONS

Office Action Received for Taiwan Application No. 111106191, mailed on Mar. 27, 2025, 14 pages. (English translation Provided).

\* cited by examiner

Primary Examiner — Scott C Sun
(74) Attorney, Agent, or Firm — Alleman Hall & Tuttle LLP

(57) ABSTRACT

A computing device, including a processor configured to perform data transfer scheduling for a hardware accelerator including a plurality of processing areas. Performing data transfer scheduling may include receiving a plurality of data transfer instructions that encode requests to transfer data to respective processing areas. Performing data transfer scheduling may further include identifying a plurality of transfer path conflicts between the data transfer instructions. Performing data transfer scheduling may further include sorting the data transfer instructions into a plurality of transfer instruction subsets. Within each transfer instruction subset, none of the data transfer instructions have transfer path conflicts. For each transfer instruction subset, performing data transfer scheduling may further include conveying the data transfer instructions included in that transfer instruction subset to the hardware accelerator. The data transfer instructions may be conveyed in a plurality of sequential data transfer phases that correspond to the transfer instruction subsets.

20 Claims, 14 Drawing Sheets

Related U.S. Application Data continuation of application No. 17/191,610, filed on Mar. 3, 2021, now Pat. No. 11,593,164.

(51) Int. Cl.
*G06F 9/50* (2006.01)
*G06F 9/54* (2006.01)

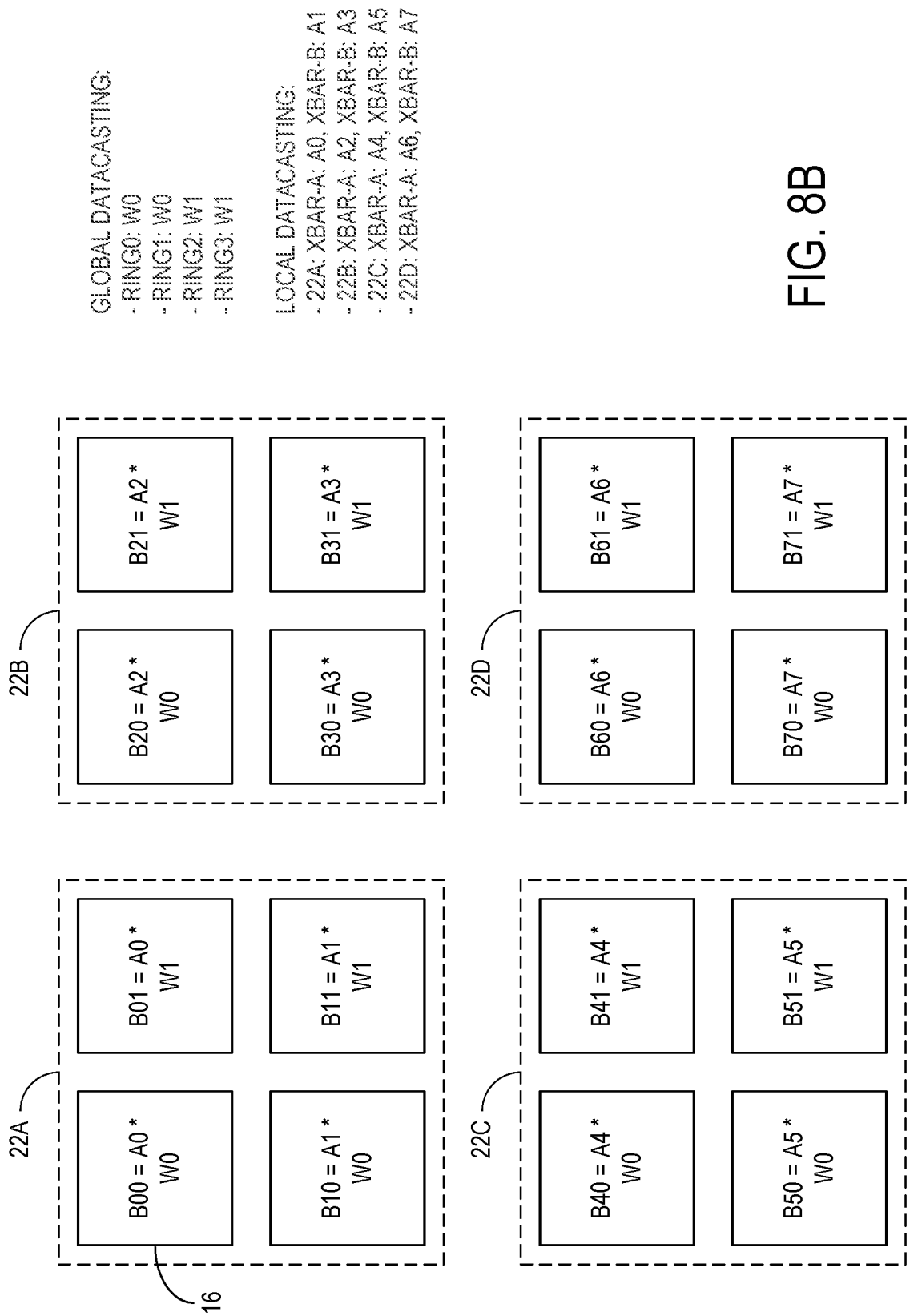

DATA TRANSFER SCHEDULING FOR HARDWARE ACCELERATOR

CROSS REFERENCE TO RELATED APPLICATIONS

This application is a continuation of U.S. patent application Ser. No. 18/173,257, filed Feb. 23, 2023, which is a continuation of U.S. patent application Ser. No. 17/191,610, filed Mar. 3, 2021, now granted as U.S. Pat. No. 11,593,164, the entirety of each of which are hereby incorporated herein by reference for all purposes.

BACKGROUND

Hardware accelerators for performing specific types of computations are frequently included in computing devices. Such hardware accelerators are designed to perform specific subsets of computing operations more efficiently than those operations would typically be performed at a general-purpose processor. For example, hardware accelerators may be specialized for operations that frequently occur in applications such as machine learning or graphics rendering.

SUMMARY

According to one aspect of the present disclosure, a computing device is provided, including a processor configured to perform data transfer scheduling for a hardware accelerator including a plurality of processing areas. Performing data transfer scheduling may include receiving a plurality of data transfer instructions that encode requests to transfer data to respective processing areas of the plurality of processing areas included in the hardware accelerator. Performing data transfer scheduling may further include identifying a plurality of transfer path conflicts between the plurality of data transfer instructions. Performing data transfer scheduling may further include sorting the plurality of data transfer instructions into a plurality of transfer instruction subsets that each include two or more data transfer instructions of the plurality of data transfer instructions. Within each transfer instruction subset, none of the two or more data transfer instructions have transfer path conflicts with each other. For each transfer instruction subset of the plurality of transfer instruction subsets, performing data transfer scheduling may further include conveying the plurality of data transfer instructions included in that transfer instruction subset to the hardware accelerator. The plurality of data transfer instructions may be conveyed to the hardware accelerator in a plurality of sequential data transfer phases that correspond to the plurality of transfer instruction subsets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 8A-8B schematically show a second example of quantities that may be computed at the processing areas of the hardware accelerator when the hardware accelerator performs matrix multiplication, according to the configuration of FIG. 1.

DETAILED DESCRIPTION

When data is processed at a hardware accelerator, time is spent performing computations on the data at processing areas included in the hardware accelerator. In addition, time is spent retrieving data from memory, moving data between processing areas, and conveying data to memory. Reducing the amount of time spent on data movement may increase the speed at which the hardware accelerator is capable of processing data. In order to reduce the amount of time spent on data movement, data transfer scheduling may be performed. As discussed in further detail below, data transfer scheduling may include determining the timings with which data transfer instructions are sent from a processor to a hardware accelerator. A further objective of data transfer scheduling is to avoid errors that may occur when components of the hardware accelerator concurrently execute conflicting data transfer instructions.

Figure 1:
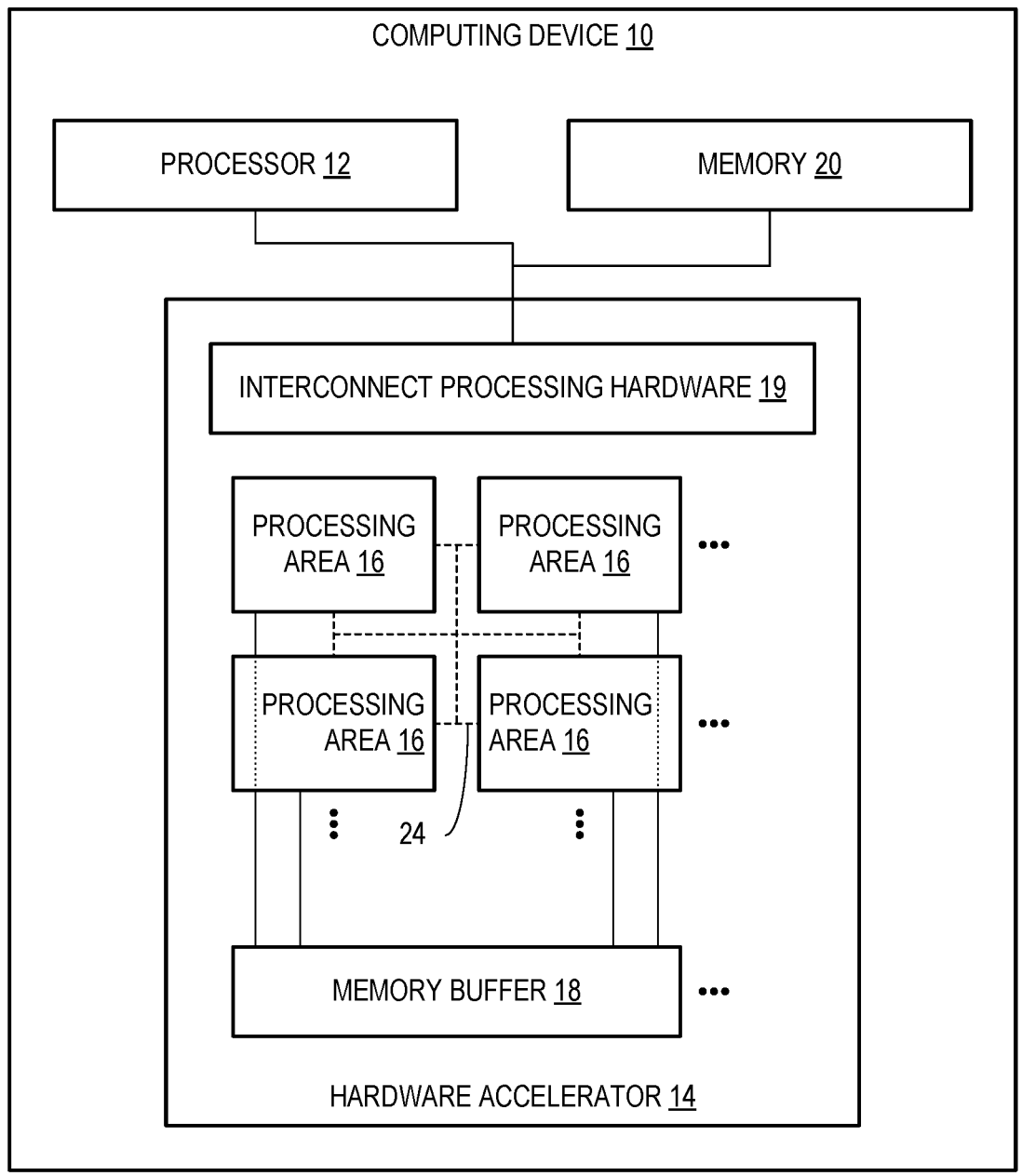
FIG. 1 schematically shows a computing device including a processor, memory, and a hardware accelerator, according to one example configuration.

FIG. 1 shows a computing device 10 according to one example embodiment. The computing device 10 may include a processor 12 and memory 20. The processor 12 may include one or more processor cores. In addition, the memory 20 may, for example, include volatile and nonvolatile memory. The computing device 10 may further include a hardware accelerator 14 that includes a plurality of processing areas 16. The hardware accelerator 14 may further include one or more memory buffers 18 communicatively coupled to the plurality of processing areas 16. As discussed in further detail below, the plurality of processing areas 16 may be coupled to each other and to the plurality of memory buffers 18 by a plurality of interconnects 24, which may be electrical connections (e.g. wires) included in the hardware accelerator 14.

The processor 12, the memory 20, and the hardware accelerator 14 may be communicatively coupled to each other such that data may be transferred between them. For example, the processor 12, the memory 20, and the hardware accelerator 14 may be electrically coupled over a motherboard. In some examples, the hardware accelerator 14 may further include interconnect processing hardware 19 configured to process instructions received from the processor 12 or from other components of the computing device 10. The interconnect processing hardware 19 may be configured to implement control logic for the processing areas 16 and the memory buffers 18.

The computing device 10 may further include one or more additional components not shown in FIG. 1, such as one or more input devices and/or one or more output devices.

In some examples, the computing device 10 may be instantiated across a plurality of physical computing devices rather than as a single physical computing device. In such examples, the processor 12 and/or the memory 20 may be distributed between the plurality of physical computing devices. The plurality of physical computing devices may, for example, be located in a data center and communicatively coupled by a network within the data center.

Figure 2:
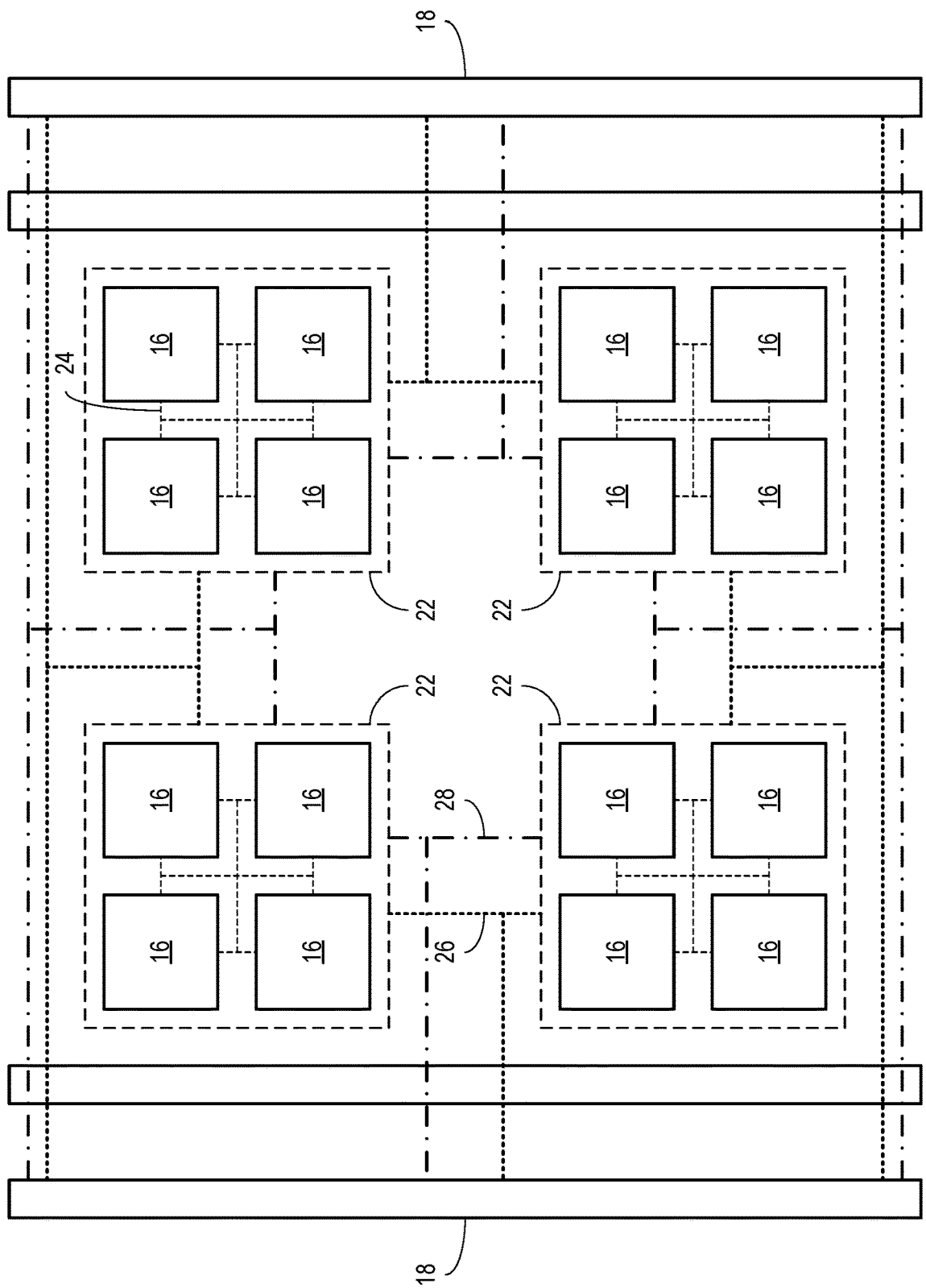
FIG. 2 shows an example configuration of processing areas and memory buffers in the hardware accelerator, according to the configuration of FIG. 1.

FIG. 2 shows an example configuration of the plurality of processing areas 16 and the plurality of memory buffers 18 included in the hardware accelerator. In some examples, the hardware accelerator 14 may include a plurality of copies of the configuration shown in FIG. 2, which may be tiled on a chip surface of the hardware accelerator 14. As shown in FIG. 2, the plurality of processing areas 16 may be arranged in a plurality of processing area groups 22. Each processing area group 22 of the plurality of processing area groups 22 may include three or more processing areas 16 of the plurality of processing areas 16 that are arranged in a fully connected graph. The example configuration of FIG. 2 includes four processing area groups 22, and each processing area group 22 includes four processing areas 16 coupled to each other by interconnects 24 arranged in a crossbar structure. Thus, within each processing area group 22, each processing area 16 may be configured to receive data from, and transmit data to, each of the other processing areas 16 in the processing area group 22.

As depicted in FIG. 2, each processing area group 22 of the plurality of processing area groups 22 may be connected to two or more other processing area groups 22. In some examples, as shown in FIG. 2, each processing area group 22 of the plurality of processing area groups 22 may be connected to the two or more other processing area groups 22 by a first interconnect ring 26 and a second interconnect ring 28. Via the first interconnect ring 26 and the second interconnect ring 28, data may be transferred between the plurality of processing area groups 22. In addition, data may be transferred between the memory buffers 18 and the plurality of processing areas 16 via the first interconnect ring 26 and the second interconnect ring 28. In the example of FIG. 2, each of the four processing area groups 22 is connected to four memory buffers 18 via the first interconnect ring 26 and the second interconnect ring 28.

Other example configurations of the processing areas 16 and memory buffers 18 included in the hardware accelerator 14 may include other numbers of processing area groups 22, memory buffers 18, and/or interconnect rings. In addition, the processing area groups 22 in other configurations may include different numbers of processing areas 16.

Figure 3:
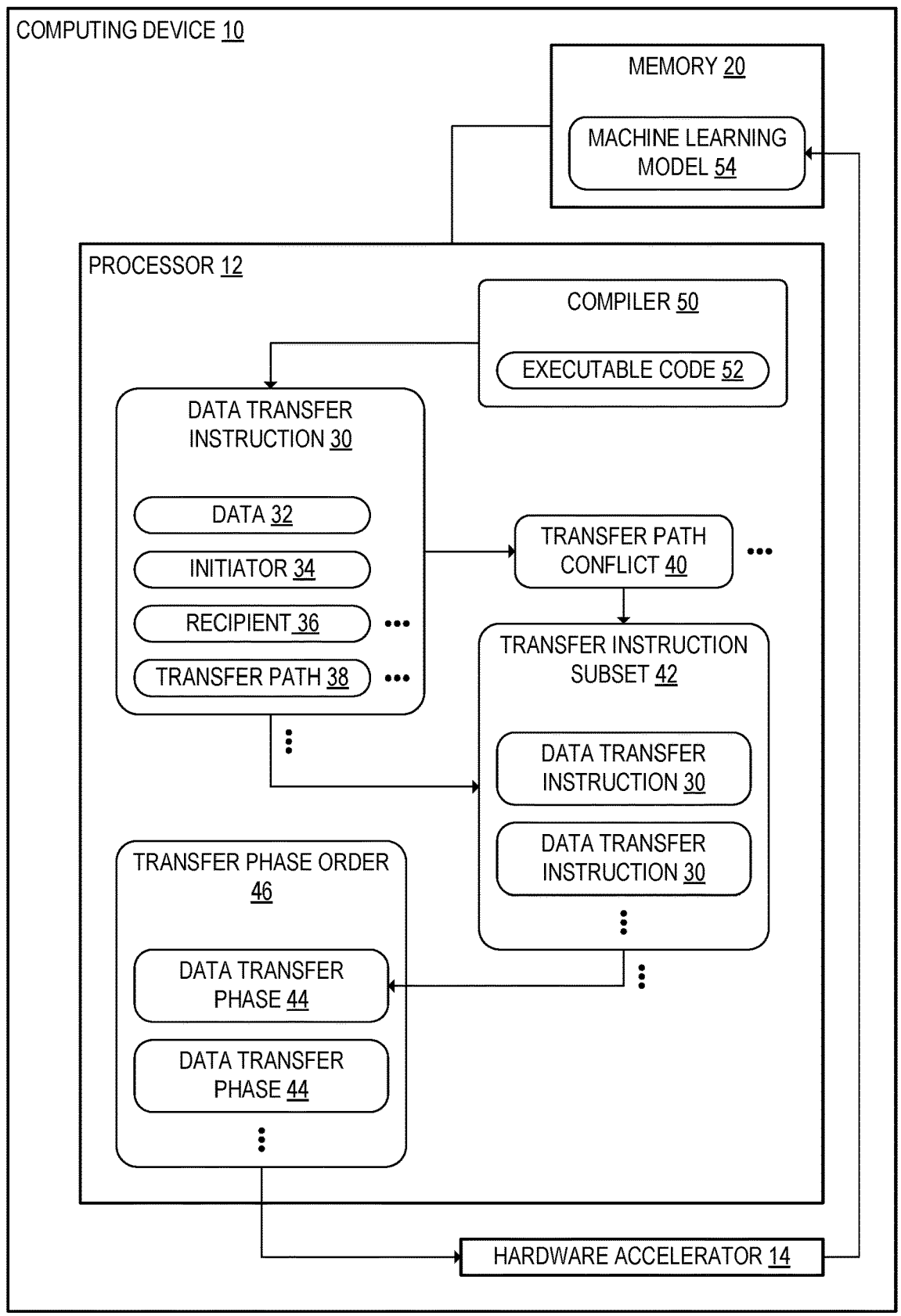
FIG. 3 schematically shows the computing device when the processor performs data transfer scheduling for the hardware accelerator, according to the configuration of FIG. 1.

Turning now to FIG. 3, the computing device 10 of FIG. 1 is schematically shown when the processor 12 performs data transfer scheduling for the hardware accelerator 14. Performing data transfer scheduling may include receiving a plurality of data transfer instructions 30. The data transfer instructions 30 may encode requests to transfer data 32 to respective processing areas 16 of the plurality of processing areas 16 included in the hardware accelerator 14. For example, each data transfer instruction 30 of the plurality of data transfer instructions 30 may encode a request to transfer data 32 from a memory buffer 18 to a processing area 16 of the plurality of processing areas 16, or from a first processing area of the plurality of processing areas 16 to a second processing area of the plurality of processing areas 16. Each data transfer instruction 30 may include an indication of the data 32 configured to be transferred. This indication may be the data 32 itself or may alternatively indicate one or more memory addresses at which the data 32 is stored.

Each data transfer instruction 30 may further indicate an initiator 34 from which the data 32 is configured to be transmitted and one or more recipients 36 to which the data 32 is configured to be transmitted. The initiator 34 may be a processing area 16 or a memory buffer 18. In some examples, at least one data transfer instruction 30 of the plurality of data transfer instructions 30 may be an instruction to multi-cast the data 32 from an initiator processing area to a plurality of recipient processing areas. Additionally or alternatively, at least one data transfer instruction 30 may be an instruction to multi-cast the data 32 from an initiator memory buffer to a plurality of recipient processing areas.

Each data transfer instruction 30 may, in some examples, further indicate a transfer path 38 along which the data 32 is configured to be transferred within the hardware accelerator 14 when it is transmitted from the initiator 34 to a recipient 36. Each transfer path 38 may specify one or more interconnects 24 along which the data 32 is configured to be transmitted. In some examples, the transfer path 38 for a data transfer instruction 30 may specify each interconnect 24 that is configured to be used when executing the data transfer instruction 30. In examples in which the data 32 is configured to be multi-cast from the initiator 34, the data transfer instruction 30 may indicate a respective transfer path 38 for each recipient 36.

In some examples, the plurality of data transfer instructions 30 may be received from a compiler 50 executed at the processor 12. The compiler 50 may be configured to generate executable code 52 that, when executed, causes the computing device 10 to train a machine learning model 54 at least in part at the hardware accelerator 14. The plurality of data transfer instructions 30 may be included in the executable code 52 generated at the compiler 50. When the hardware accelerator 14 receives the transfer instructions 30, the hardware accelerator 14 may, for example, be configured to compute a plurality of matrix products that are used in the machine learning model 54. Outputs generated at the hardware accelerator 14 may be stored in the memory 20 as part of the machine learning model 54.

In other examples, operations other than training a machine learning model 54 may be performed at least in part at the hardware accelerator 14. For example, inferencing using a trained machine learning model 54 may be performed. As another example, the hardware accelerator 14 may be utilized when generating computer graphics.

Figure 4:
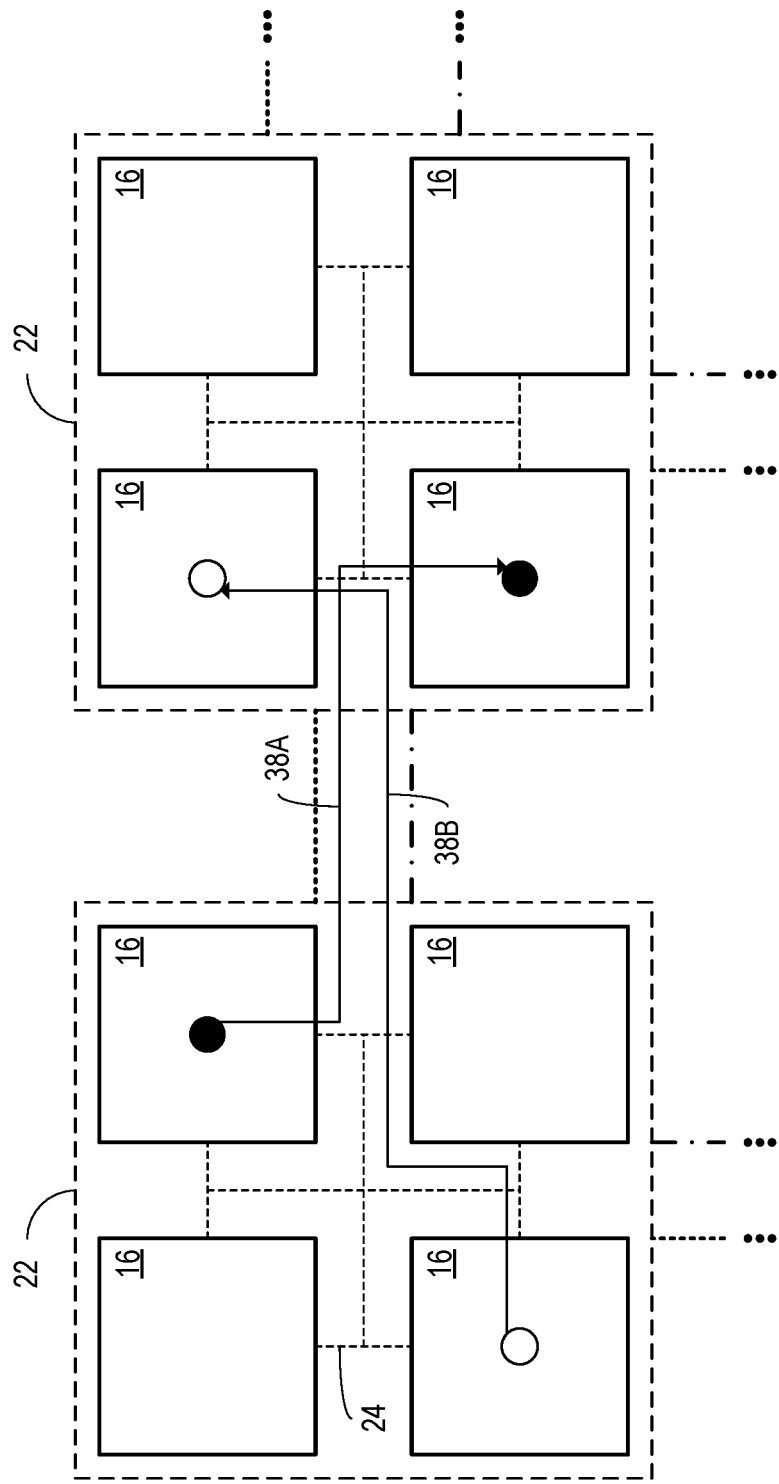
FIG. 4 shows a portion of the hardware accelerator when a transfer path conflict occurs between a first transfer path and a second transfer path, according to the configuration of FIG. 1.

Subsequently to receiving the plurality of data transfer instructions 30, performing data transfer scheduling may further include identifying a plurality of transfer path conflicts 40 between the plurality of data transfer instructions 30. Identifying the plurality of transfer path conflicts 40 may include determining that at least two data transfer instructions 30 of the plurality of data transfer instructions 30 encode respective requests to concurrently transfer data along a same interconnect 24 included in the hardware accelerator 14. Thus, a transfer path conflict 40 may occur when the transfer paths 38 for the at least two data transfer instructions 30 concurrently utilize the same interconnect 24. FIG. 4 shows, according to one example, a portion of the hardware accelerator 14 when a transfer path conflict 40 occurs between a first transfer path 38A and a second transfer path 38B. As shown in the example of FIG. 4, the first transfer path 38A and the second transfer path 38B both include the interconnect 24 located at the leftmost end of the processing area group 22 located on the right. If data transfers along the first transfer path 38A and the second transfer path 38B were performed concurrently, the electrical signals traveling along the interconnect 24 may interfere with each other, thereby leading to errors.

Returning to FIG. 3, subsequently to identifying the plurality of transfer path conflicts 40, performing data transfer scheduling may further include sorting the plurality of data transfer instructions 30 into a plurality of transfer instruction subsets 42. The plurality of transfer instruction subsets 42 may each include two or more data transfer instructions 30 of the plurality of data transfer instructions 30. The processor 12 may be configured to select the data transfer instructions 30 for each transfer instruction subset 42 such that within each transfer instruction subset 42, none of the two or more data transfer instructions 30 have transfer path conflicts 40 with each other.

Figure 5:
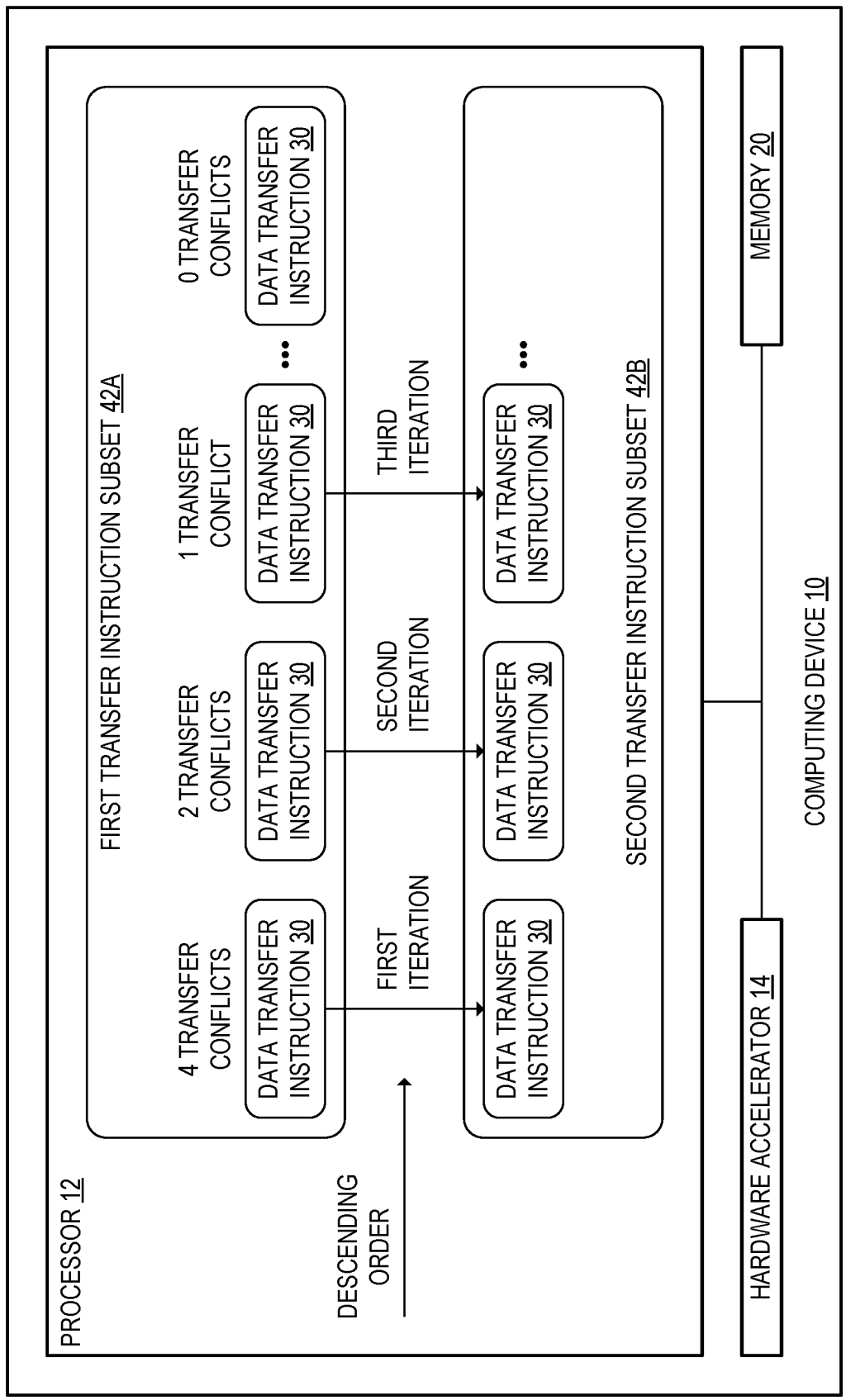
FIG. 5 schematically shows the computing device when the processor sorts a plurality of data transfer instructions into a plurality of transfer instruction subsets, according to the configuration of FIG. 1.

In some examples, as schematically shown in FIG. 5, the processor 12 may be configured to sort the plurality of data transfer instructions 30 into the plurality of transfer instruction subsets 42 over a plurality of iterations. The plurality of iterations may be performed for a first transfer instruction subset 42A until no data transfer instructions 30 included in the first transfer instruction subset 42A have transfer path conflicts 40. Each iteration may include moving a conflicting data transfer instruction 30 that has one or more transfer path conflicts 40 from the first transfer instruction subset 42A to a second transfer instruction subset 42B. In each iteration, sorting the plurality of data transfer instructions 30 may further include determining whether the first transfer instruction subset 42A includes a plurality of conflicting data transfer instructions 30. Thus, the processor 12 may be configured to determine whether any of the remaining data transfer instructions 30 included in the first transfer instruction subset 42A still have transfer path conflicts 40 with one or more other data transfer instructions 30 in the first transfer instruction subset 42A after the conflicting data transfer instruction 30 has been removed from the first transfer instruction subset 42A. When the first transfer instruction subset 42A still includes conflicting data transfer instructions 30, the processor 12 may be configured to perform another iteration. Otherwise, the processor 12 may be further configured to repeat the above steps of sorting the data transfer instructions, but with the second transfer instruction subset 42B taking the place of the first transfer instruction subset 42A. When the above steps are repeated in this way, conflicting data transfer instructions 30 may be moved from the second transfer instruction subset 42B to a third transfer instruction subset. The processor 12 may be configured to generate, and move conflicting data transfer instructions 30 into, additional transfer instruction subsets until none of the transfer instruction subsets 42 have any transfer path conflicts 40 between their respective data transfer instructions 30.

In some examples, when the first transfer instruction subset 42A includes a plurality of conflicting data transfer instructions 30, sorting the plurality of data transfer instructions 30 into the plurality of transfer instruction subsets 42 may further include ranking the plurality of conflicting data transfer instructions 30 according to respective numbers of transfer path conflicts 40 between those conflicting data transfer instructions 30. In the example of FIG. 5, the plurality of data transfer instructions 30 included in the first transfer instruction subset 42A are shown from left to right in descending order of the number of transfer path conflicts 40 they have with other data transfer instructions 30 included in the first transfer instruction subset 42A. In each iteration, the conflicting data transfer instruction 30 that is moved to the second transfer instruction subset 42B may be a conflicting data transfer instruction 30 with a highest number of transfer path conflicts 40. Thus, data transfer instructions 30 may be moved to the second transfer instruction subset 42B in descending order of number of transfer path conflicts 40. Moving conflicting data transfer instructions 30 to the second transfer instruction subset 42B in descending order of number of transfer path conflicts 40 may reduce a total number of moves performed and may thereby allow data transfer scheduling to be performed more efficiently. In addition, moving conflicting data transfer instructions 30 to the second transfer instruction subset 42B in descending order of number of transfer path conflicts 40 may allow the total number of transfer instruction subsets 42 to be reduced, which may allow the plurality of data transfer instructions 30 to be executed more quickly at runtime.

After the plurality of data transfer instructions 30 have been sorted, performing data transfer scheduling may further include, for each transfer instruction subset 42 of the plurality of transfer instruction subsets 42, conveying the plurality of data transfer instructions 30 included in that transfer instruction subset 42 to the hardware accelerator 14. As shown in FIG. 3, the plurality of data transfer instructions 30 may be conveyed to the hardware accelerator 14 in a plurality of sequential data transfer phases 44 that correspond to the plurality of transfer instruction subsets 42. Thus, the processor 12 may be configured to convey the data transfer instructions 30 to the hardware accelerator 14 in sequential batches within which none of the data transfer instructions 30 have transfer path conflicts 40. The hardware accelerator 14 may accordingly process the data transfer instructions 30 efficiently by performing a plurality of data transfers concurrently without any of the data transfers conflicting with each other.

Figure 6:
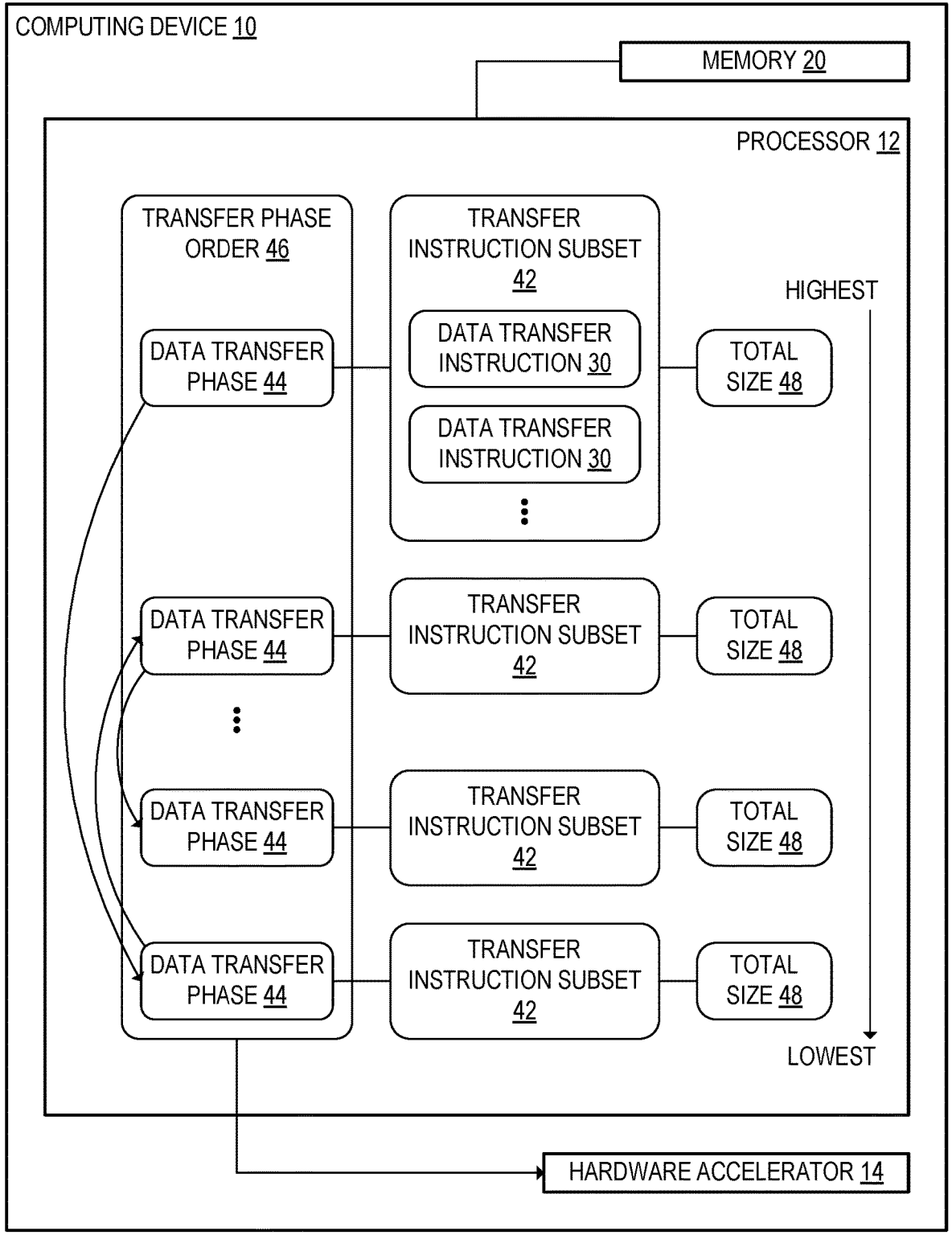
FIG. 6 schematically shows the computing device when the processor determines a transfer phase order for the plurality of transfer instruction subsets, according to the configuration of FIG. 1.

The processor 12 may be further configured to determine a transfer phase order 46 in which the data transfer phases 44 are performed. FIG. 6 schematically shows the computing device 10 when the processor 12 determines the transfer phase order 46. Determining the data transfer phase order 46 may include ranking the plurality of transfer instruction subsets 42 based on respective total sizes 48 of the data 32 indicated for transfer by the corresponding two or more data transfer instructions 30 included in each transfer instruction subset 42. Performing data transfer scheduling may further include conveying the plurality of data transfer instructions 30 included in the plurality of transfer instruction subsets 42 to the hardware accelerator 14 according to the data transfer phase order 46. In some examples, as shown in FIG. 6, the data transfer phase order 46 may alternate between descending order of total size 48 and ascending order of total size 48. In such examples, the processor 12 may be configured to first convey, to the hardware accelerator 14, the transfer instruction subset 42 including data transfer instructions 30 indicating a highest total size 48. The processor 12 may then be further configured to convey, to the hardware accelerator 14, the transfer instruction subset 42 including data transfer instructions 30 indicating a lowest total size 48. When the data transfer phase order 46 includes more than two data transfer phases 44, as in the example of FIG. 6, the processor 12 may be further configured to convey, to the hardware accelerator 14, the transfer instruction subset 42 including data transfer instructions 30 indicating a second-highest total size 48. The processor 12 may be further configured to continue alternating between the transfer instruction subsets 42 with the next-highest and next-lowest total sizes 48. By alternating between descending order and ascending order in this way, the processor 12 may be configured to stabilize the rate at which data transfer is performed over time at the hardware accelerator 14. Thus, load balancing may be performed more easily and with higher accuracy for the processor 12 and the hardware accelerator 14.

Figure 7A:
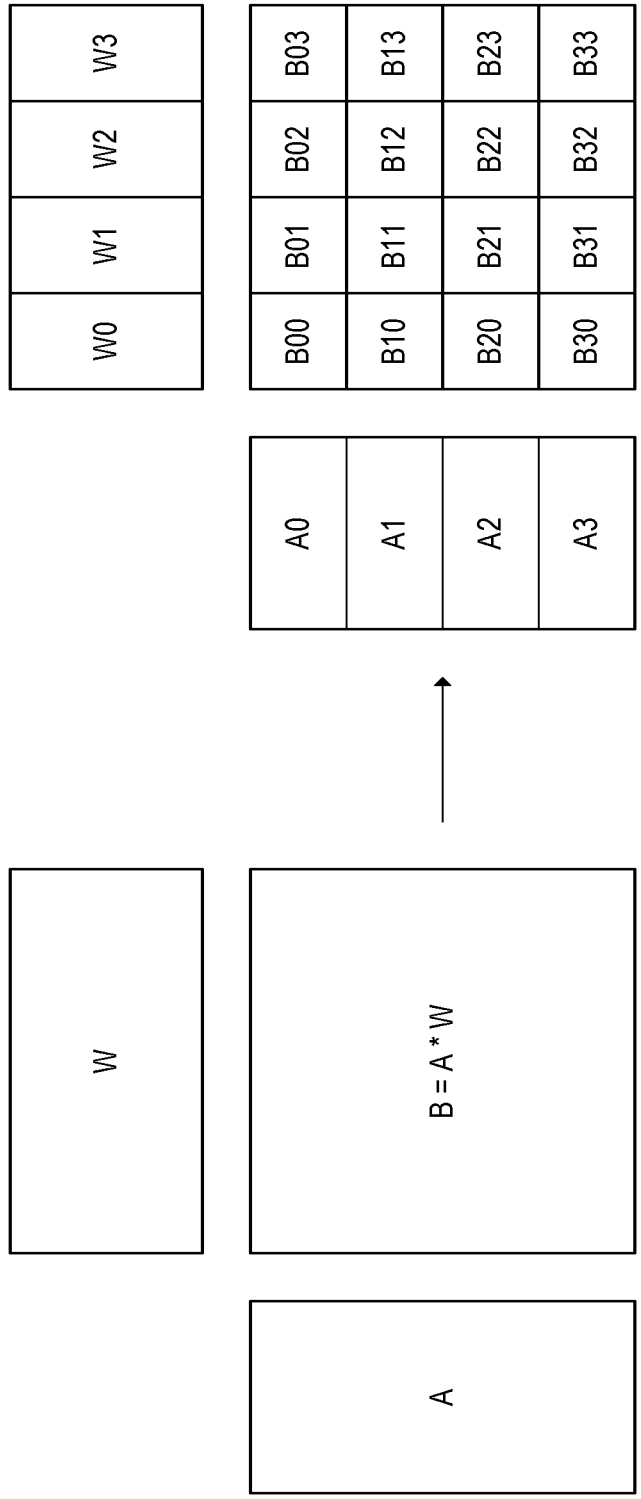
FIGS. 7A-7B schematically show a first example of quantities that may be computed at the processing areas of the hardware accelerator when the hardware accelerator performs matrix multiplication, according to the configuration of FIG. 1.
Figure 7B:
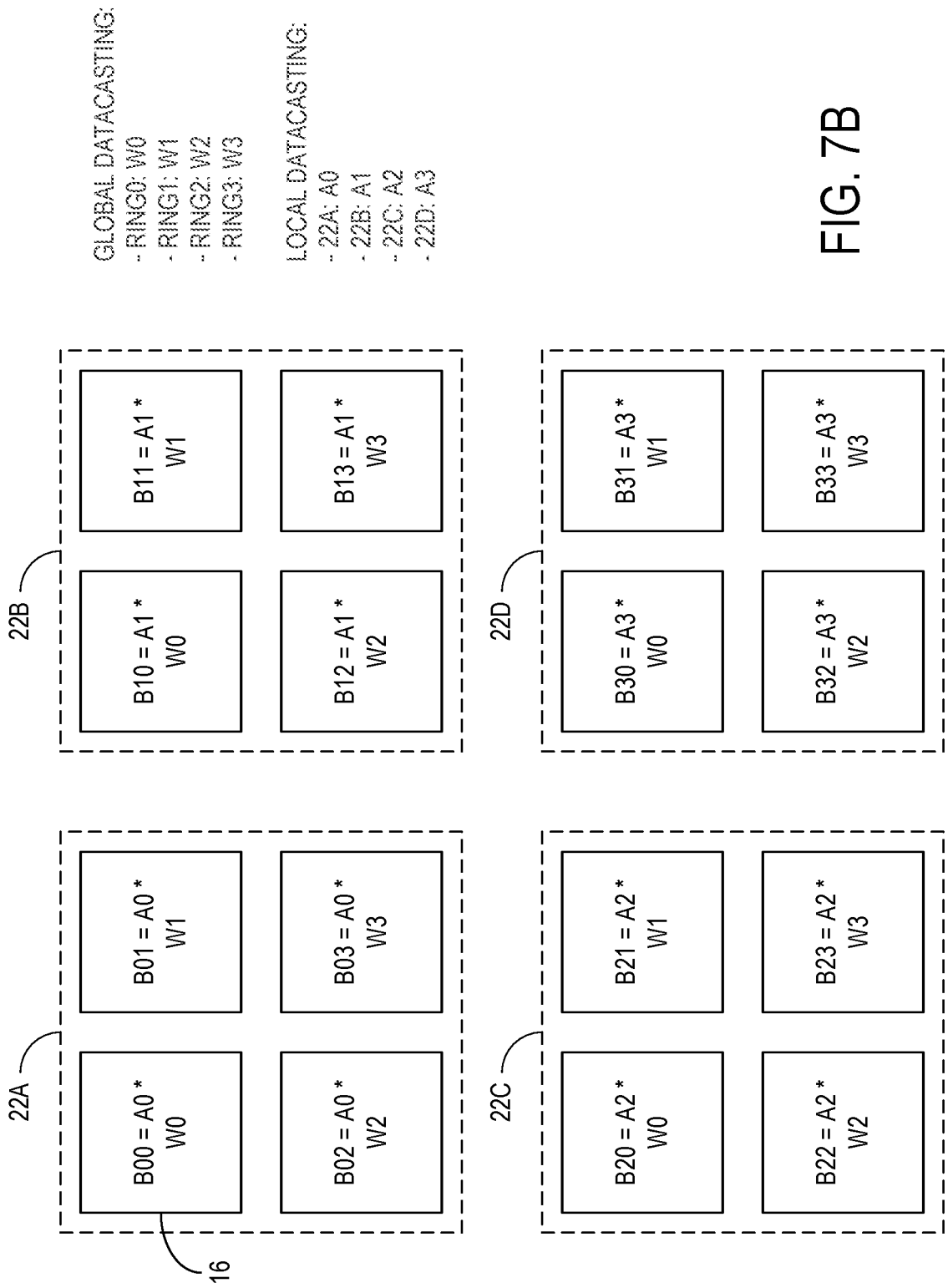

FIGS. 7A-8B schematically show example quantities that may be computed at the processing areas 16 of the hardware accelerator 14 when the hardware accelerator 14 is configured to perform matrix multiplication. In the example of FIGS. 7A-7B, the hardware accelerator is configured to multiply a matrix A by a matrix W to obtain a matrix B. The hardware accelerator 14 may be configured to divide the matrix A into input submatrices A0, A1, A2, and A3 and divide the matrix W into input submatrices W0, W1, W2, and W3. At the plurality of processing areas 16, the hardware accelerator 14 may be further configured to compute products of each of the input submatrices of A with each of the input submatrices of W. The processing areas 16 may be grouped into a first processing area group 22A, a second processing area group 22B, a third processing area group 22C, and a fourth processing area group 22D. The hardware accelerator 14 may be configured to convey the input submatrices W0, W1, W2, and W3 from one or more memory buffers 18 to the plurality of processing areas 16 by multi-casting the entries of each of the input submatrices W0, W1, W2, and W3 to each of the four processing area groups 22. In addition, the hardware accelerator 14 may be further configured to convey the input submatrices A0, A1, A2, and A3 from the one or more memory buffers 18 to the first processing area group 22A, the second processing area group 22B, the third processing area group 22C, and the fourth processing area group 22D, respectively. The processor 12 may then multi-cast the input submatrices A0, A1, A2, and A3 within their respective processing area groups 22 to each processing area 16 within that processing area group 22.

Figure 8A:
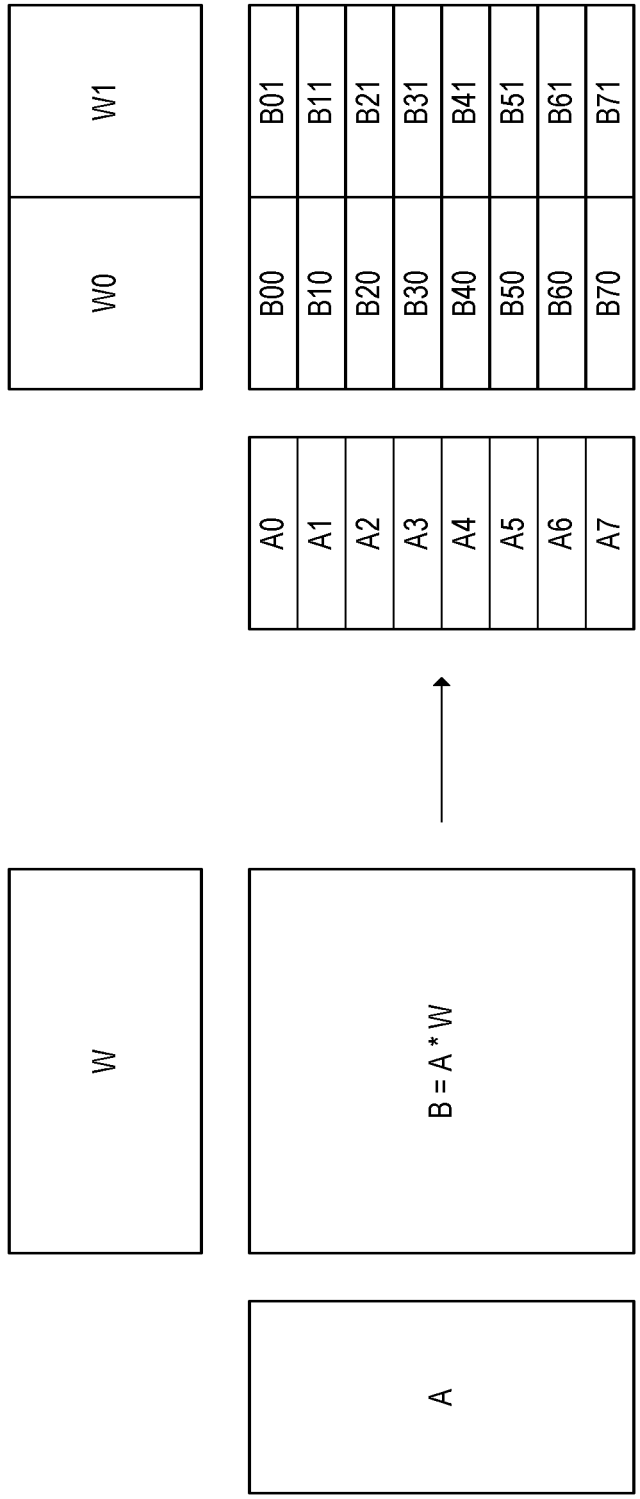

In the example of FIGS. 8A-8B, the hardware accelerator 14 is configured to divide the input matrix A into input submatrices A0, A1, A2, A3, A4, A5, A6, and A7, and is further configured to divide the input matrix W into input submatrices W0 and W1. The hardware accelerator 14 may be further configured to multi-cast the input submatrices W0 and W1 to each of the plurality of processing area groups 22, within which the input submatrices W0 and W1 may each be transmitted to two processing areas 16. In addition, the hardware accelerator 14 may be further configured to convey the input submatrices A0 and A1 to the first processing area group 22A, the input submatrices A2 and A3 to the second processing area group 22B, the input submatrices A4 and A5 to the third processing area group 22C, and the input submatrices A6 and A7 to the fourth processing area group 22D. Within each of the processing area groups 22, each of the input matrices A0-A7 may be transmitted to two of the processing areas 16 included in that processing area group 22.

Figure 9A:
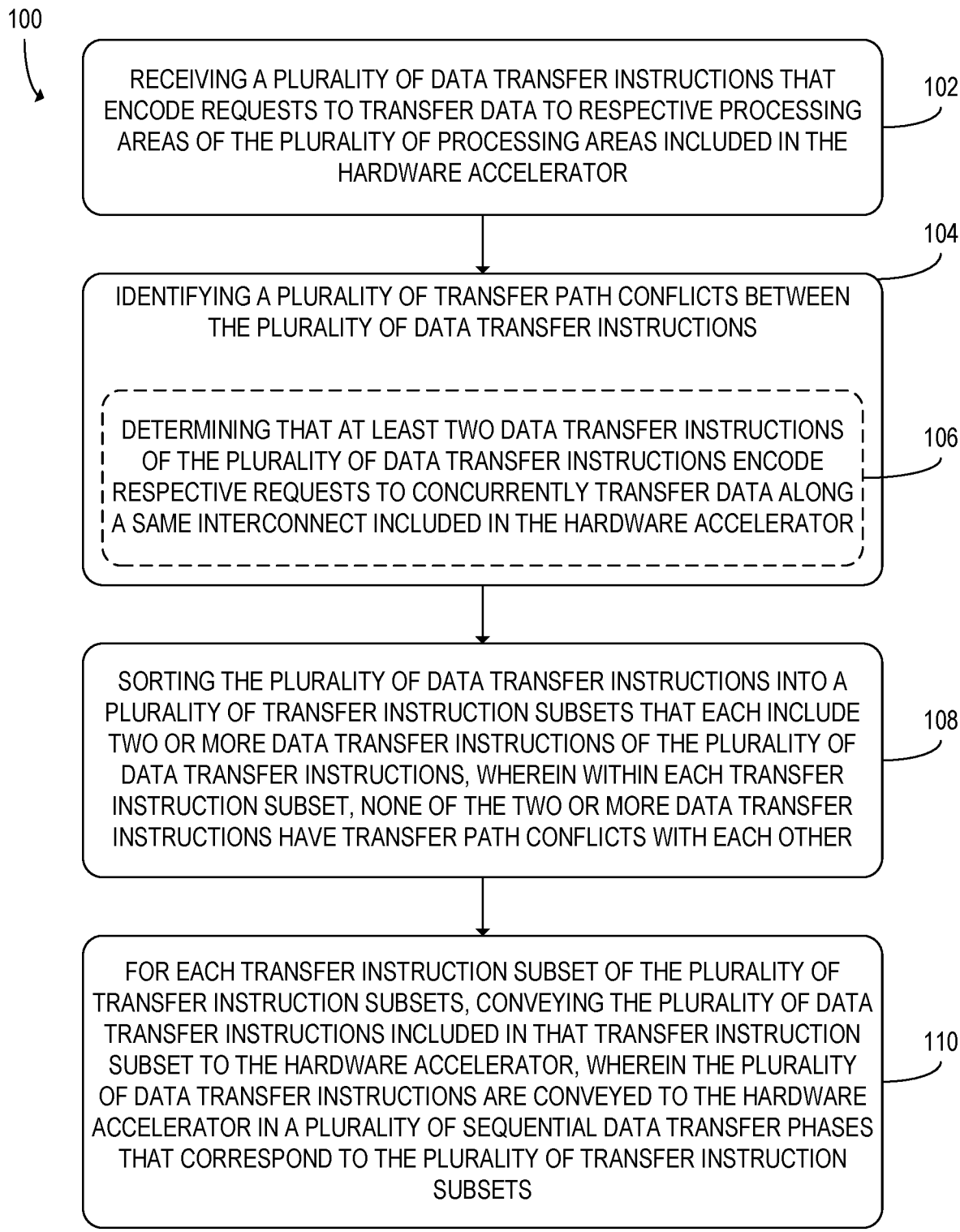
FIG. 9A shows a flowchart of a method for use at a computing device to perform data transfer scheduling for a hardware accelerator, according to the configuration of FIG. 1.

Turning now to FIG. 9A, a flowchart of a method 100 is provided for use at a computing device to perform data transfer scheduling for a hardware accelerator including a plurality of processing areas. The steps of the method 100 may be performed at a processor. In addition, the hardware accelerator for which data transfer scheduling is performed may be a hardware accelerator configured to perform matrix multiplication.

The method 100 may include, at step 102, receiving a plurality of data transfer instructions that encode requests to transfer data to respective processing areas of the plurality of processing areas included in the hardware accelerator. In some examples, each data transfer instruction may specify the data to be transmitted, an initiator from which the data is configured to be transmitted, one or more recipients to which the data is configured to be transmitted, and a transfer path including one or more interconnects along which the data is configured to be transmitted. Each interconnect indicated in the transfer path of a data transfer instruction may be an electrical connection between a memory buffer and a processing area or between a first processing area and a second processing area.

Each data transfer instruction of the plurality of data transfer instructions may encode a request to transfer data from a memory buffer included in the hardware accelerator to a processing area of the plurality of processing areas, or from a first processing area of the plurality of processing areas to a second processing area of the plurality of processing areas. In some examples, at least one data transfer instruction of the plurality of data transfer instructions may be an instruction to multi-cast the data from an initiator processing area or an initiator memory buffer to a plurality of recipient processing areas. The at least one data transfer instruction may, in such examples, indicate a plurality of recipients and a corresponding plurality of transfer paths between the initiator and those recipients.

In some examples, the plurality of data transfer instructions may be received from a compiler configured to generate executable code. The executable code may, when executed, be configured to cause the computing device to train a machine learning model at least in part at the hardware accelerator. The hardware accelerator may, in such examples, perform one or more matrix multiplication operations when training the machine learning model. Outputs of the hardware accelerator that are incorporated into the machine learning model may be stored in memory.

At step 104, the method 100 may further include identifying a plurality of transfer path conflicts between the plurality of data transfer instructions. Identifying the plurality of transfer path conflicts may include, at step 106, determining that at least two data transfer instructions of the plurality of data transfer instructions encode respective requests to concurrently transfer data along a same interconnect included in the hardware accelerator. Thus, if the at least two data transfer instructions were to be executed concurrently, an error may occur when attempting to perform multiple concurrent data transfers along the same interconnect.

At step 108, the method 100 may further include sorting the plurality of data transfer instructions into a plurality of transfer instruction subsets that each include two or more data transfer instructions of the plurality of data transfer instructions. The plurality of data transfer instructions may be sorted such that within each transfer instruction subset, none of the two or more data transfer instructions have transfer path conflicts with each other.

At step 110, the method 100 may further include, for each transfer instruction subset of the plurality of transfer instruction subsets, conveying the plurality of data transfer instructions included in that transfer instruction subset to the hardware accelerator. The plurality of data transfer instructions may be conveyed to the hardware accelerator in a plurality of sequential data transfer phases that correspond to the plurality of transfer instruction subsets. Thus, when the plurality of data transfer instructions are conveyed to the hardware accelerator, transfer path conflicts between the data transfer instructions may be avoided.

Figure 9B:
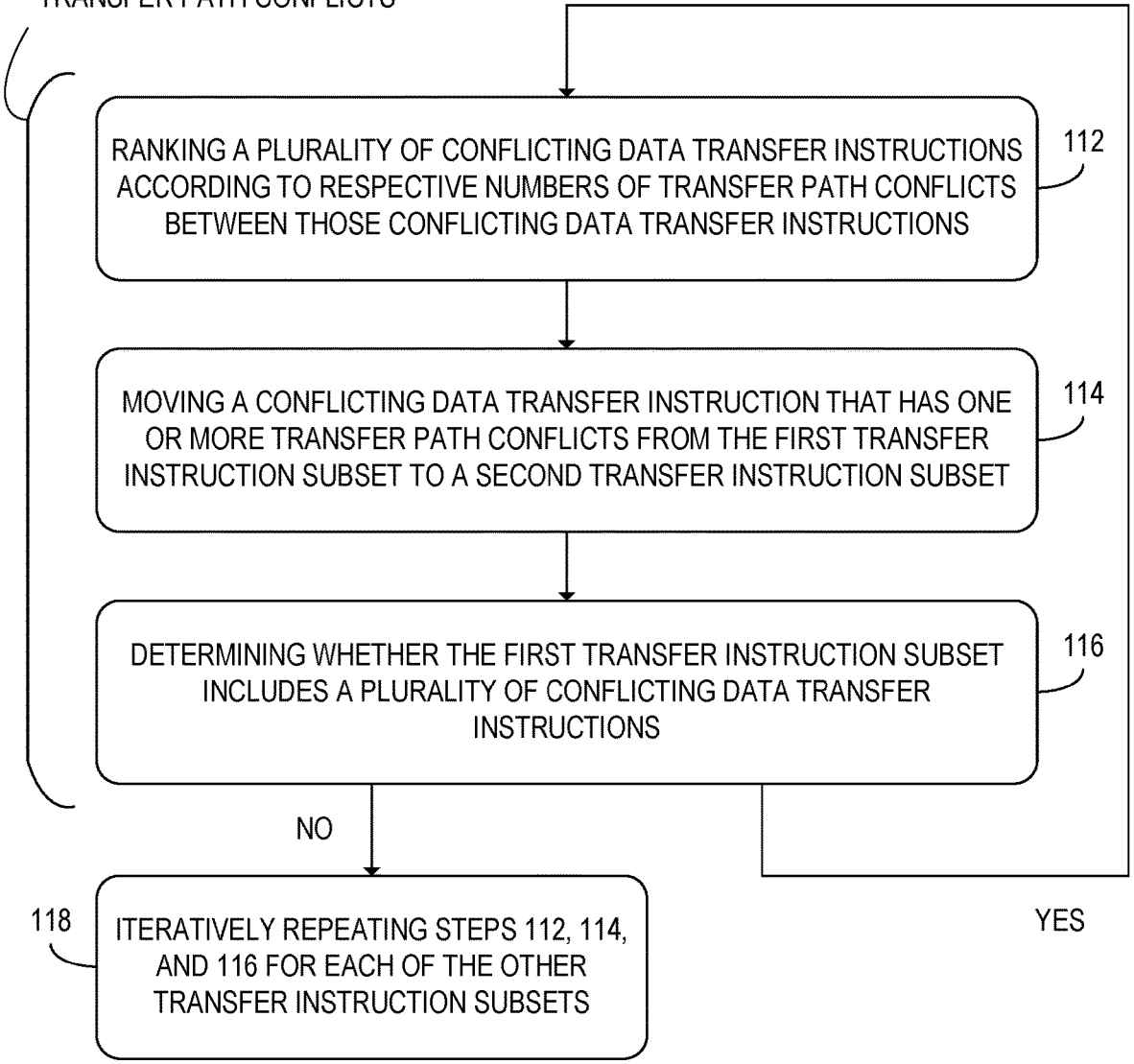
FIG. 9B shows additional steps of the method of FIG. 9A that may be performed when sorting a plurality of data transfer instructions.
Figure 9C:
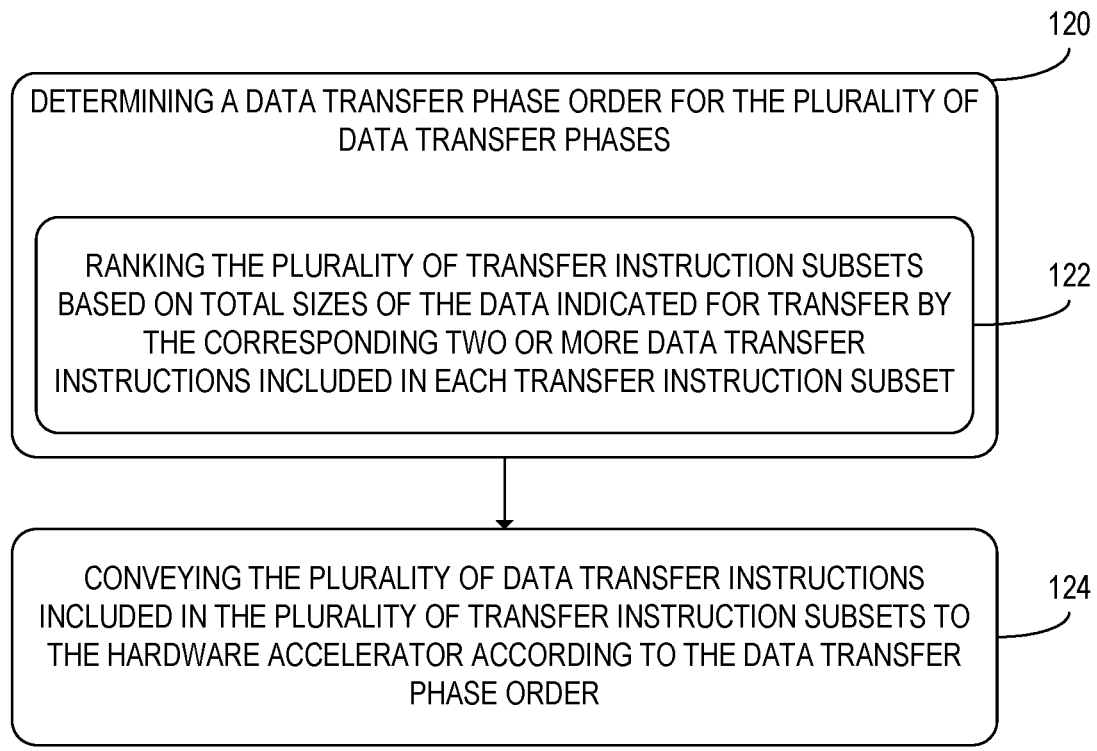
FIG. 9C shows additional steps of the method of FIG. 9A that may be performed when conveying a plurality of data transfer instructions to the hardware accelerator.

FIGS. 9B-9C show additional steps of the method 100 that may be performed in some examples. The steps of FIG. 9B may be performed when sorting the plurality of data transfer instructions at step 108. In addition, the steps of FIG. 9B may be performed in a plurality of iterations performed for a first transfer instruction subset until no data transfer instructions included in the first transfer instruction subset have transfer path conflicts. At step 112, as shown in FIG. 9B, the method 100 may further include ranking a plurality of conflicting data transfer instructions according to respective numbers of transfer path conflicts between those conflicting data transfer instructions. At step 114, the method 100 may further include moving a conflicting data transfer instruction that has one or more transfer path conflicts from the first transfer instruction subset to a second transfer instruction subset. The conflicting data transfer instruction that is moved to the second transfer instruction subset at step 114 may be a conflicting data transfer instruction with a highest number of transfer path conflicts as indicated in the ranking.

At step 116, the method 100 may further include determining whether the first transfer instruction subset includes a plurality of conflicting data transfer instructions. When the first transfer instruction subset still includes a plurality of conflicting data transfer instructions, the method 100 may return to step 112 and repeat steps 112, 114, and 116. When the first transfer instruction subset does not include a plurality of conflicting data transfer instructions, the method 100 may proceed to step 118. At step 118, the method 100 may include iteratively repeating steps 112, 114, and 116 for each of the other transfer instruction subsets. When none of the transfer instruction subsets include conflicting data transfer instructions, the method 100 may proceed to step 110.

FIG. 9C shows additional steps of the method 100 that may be performed in some examples when step 110 is performed. At step 120, the method 100 may include determining a data transfer phase order for the plurality of data transfer phases. The data transfer phase order may be an order in which the data transfer phases are performed at step 110. Determining the data transfer phase ordering at step 120 may include, at step 122, ranking the plurality of transfer instruction subsets based on respective total sizes of the data indicated for transfer by the corresponding two or more data transfer instructions included in each transfer instruction subset. In some examples, the data transfer phase order may alternate between descending order of total size and ascending order of total size. Thus, in such examples, the data transfer phase order may alternate between a transfer instruction subset in which the data transfer instructions have a highest total size and a transfer instruction subset in which the data transfer instructions have a lowest total size among the remaining transfer instruction subsets. At step 124, the method 100 may further include conveying the plurality of data transfer instructions included in the plurality of transfer instruction subsets to the hardware accelerator according to the data transfer phase order.

Using the systems and methods discussed above, the transfer of data between components of a hardware accelerator may be scheduled such that transfer path conflicts may be avoided. In addition, performing data transfer scheduling as discussed above may utilize the processing areas of the hardware accelerator efficiently such that reductions are achieved in the amounts of time for which the processing areas go unused. Thus, the systems and method discussed above may allow processes such as training a machine learning model or generating computer graphics to be performed more quickly and efficiently.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
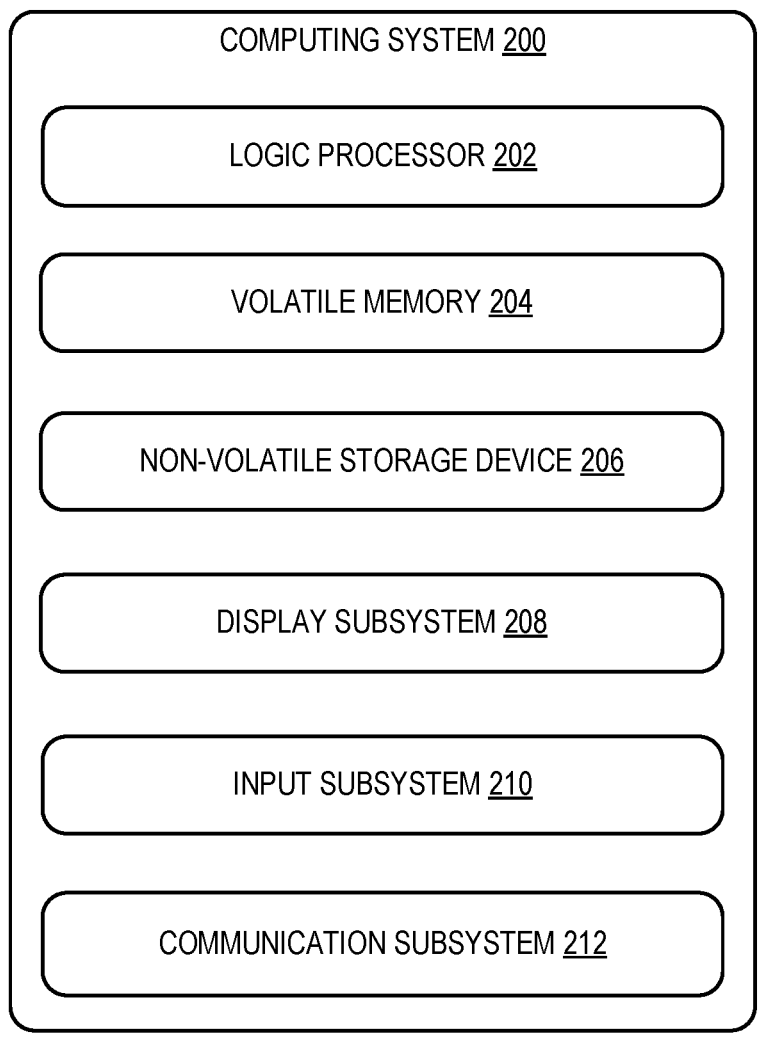
FIG. 10 shows a schematic view of an example computing environment in which the computing device of FIG. 1 may be instantiated.

FIG. 10 schematically shows a non-limiting embodiment of a computing system 200 that can enact one or more of the methods and processes described above. Computing system 200 is shown in simplified form. Computing system 200 may embody the computing device 10 described above and illustrated in FIG. 1. Components of the computing system 200 may be instantiated in one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 10.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 200 to send and/or receive messages to and/or from other devices via a network such as the Internet.

The following paragraphs discuss several aspects of the present disclosure. According to one aspect of the present disclosure, a computing device is provided, including a processor configured to perform data transfer scheduling for a hardware accelerator including a plurality of processing areas. Performing data transfer scheduling may include receiving a plurality of data transfer instructions that encode requests to transfer data to respective processing areas of the plurality of processing areas included in the hardware accelerator. Performing data transfer scheduling may further include identifying a plurality of transfer path conflicts between the plurality of data transfer instructions. Performing data transfer scheduling may further include sorting the plurality of data transfer instructions into a plurality of transfer instruction subsets that each include two or more data transfer instructions of the plurality of data transfer instructions. Within each transfer instruction subset, none of the two or more data transfer instructions may have transfer path conflicts with each other. For each transfer instruction subset of the plurality of transfer instruction subsets, performing data transfer scheduling may further include conveying the plurality of data transfer instructions included in that transfer instruction subset to the hardware accelerator. The plurality of data transfer instructions may be conveyed to the hardware accelerator in a plurality of sequential data transfer phases that correspond to the plurality of transfer instruction subsets.

According to this aspect, performing data transfer scheduling may further include determining a data transfer phase order for the plurality of data transfer phases. Determining the data transfer phase order may include ranking the plurality of transfer instruction subsets based on respective total sizes of the data indicated for transfer by the corresponding two or more data transfer instructions included in each transfer instruction subset. Performing data transfer scheduling may further include conveying the plurality of data transfer instructions included in the plurality of transfer instruction subsets to the hardware accelerator according to the data transfer phase order.

According to this aspect, the data transfer phase order may alternate between descending order of total size and ascending order of total size.

According to this aspect, each data transfer instruction of the plurality of data transfer instructions may encode a request to transfer data from a memory buffer included in the hardware accelerator to a processing area of the plurality of processing areas, or from a first processing area of the plurality of processing areas to a second processing area of the plurality of processing areas.

According to this aspect, identifying the plurality of transfer path conflicts may include determining that at least two data transfer instructions of the plurality of data transfer instructions encode respective requests to concurrently transfer data along a same interconnect included in the hardware accelerator.

According to this aspect, sorting the plurality of data transfer instructions into the plurality of transfer instruction subsets may include, in a plurality of iterations performed for a first transfer instruction subset until no data transfer instructions included in the first transfer instruction subset have transfer path conflicts, moving a conflicting data transfer instruction that has one or more transfer path conflicts from the first transfer instruction subset to a second transfer instruction subset. Sorting the plurality of data transfer instructions into the plurality of transfer instruction subsets may further include, in the plurality of iterations, determining whether the first transfer instruction subset includes a plurality of conflicting data transfer instructions.

According to this aspect, when the first transfer instruction subset includes a plurality of conflicting data transfer instructions, sorting the plurality of data transfer instructions into the plurality of transfer instruction subsets may further include ranking the plurality of conflicting data transfer instructions according to respective numbers of transfer path conflicts between those conflicting data transfer instructions. The conflicting data transfer instruction that is moved to the second transfer instruction subset may be a conflicting data transfer instruction with a highest number of transfer path conflicts.

According to this aspect, at least one data transfer instruction of the plurality of data transfer instructions may be an instruction to multi-cast the data from an initiator processing area or an initiator memory buffer to a plurality of recipient processing areas.

According to this aspect, the plurality of data transfer instructions may be received from a compiler configured to generate executable code that, when executed, causes the computing device to train a machine learning model at least in part at the hardware accelerator.

According to this aspect, the plurality of processing areas may be arranged in a plurality of processing area groups. Each processing area group of the plurality of processing area groups may include three or more processing areas of the plurality of processing areas that are arranged in a fully connected graph. Each processing area group of the plurality of processing area groups may be connected to two or more other processing area groups.

According to this aspect, each processing area group of the plurality of processing area groups may be connected to the two or more other processing area groups by a first interconnect ring and a second interconnect ring.

According to another aspect of the present disclosure, a method is provided for use at a computing device to perform data transfer scheduling for a hardware accelerator including a plurality of processing areas. The method may include receiving a plurality of data transfer instructions that encode requests to transfer data to respective processing areas of the plurality of processing areas included in the hardware accelerator. The method may further include identifying a plurality of transfer path conflicts between the plurality of data transfer instructions. The method may further include sorting the plurality of data transfer instructions into a plurality of transfer instruction subsets that each include two or more data transfer instructions of the plurality of data transfer instructions. within each transfer instruction subset, none of the two or more data transfer instructions may have transfer path conflicts with each other. For each transfer instruction subset of the plurality of transfer instruction subsets, the method may further include conveying the plurality of data transfer instructions included in that transfer instruction subset to the hardware accelerator. The plurality of data transfer instructions may be conveyed to the hardware accelerator in a plurality of sequential data transfer phases that correspond to the plurality of transfer instruction subsets.

According to this aspect, the method may further include determining a data transfer phase order for the plurality of data transfer phases. Determining the data transfer phase order may include ranking the plurality of transfer instruction subsets based on respective total sizes of the data indicated for transfer by the corresponding two or more data transfer instructions included in each transfer instruction subset. The method may further include conveying the plurality of data transfer instructions included in the plurality of transfer instruction subsets to the hardware accelerator according to the data transfer phase order.

According to this aspect, the data transfer phase order may alternate between descending order of total size and ascending order of total size.

According to this aspect, each data transfer instruction of the plurality of data transfer instructions may encode a request to transfer data from a memory buffer included in the hardware accelerator to a processing area of the plurality of processing areas, or from a first processing area of the plurality of processing areas to a second processing area of the plurality of processing areas.

According to this aspect, identifying the plurality of transfer path conflicts may include determining that at least two data transfer instructions of the plurality of data transfer instructions encode respective requests to concurrently transfer data along a same interconnect included in the hardware accelerator.

According to this aspect, sorting the plurality of data transfer instructions into the plurality of transfer instruction subsets may include, in a plurality of iterations performed for a first transfer instruction subset until no data transfer instructions included in the first transfer instruction subset have transfer path conflicts, moving a conflicting data transfer instruction that has one or more transfer path conflicts from the first transfer instruction subset to a second transfer instruction subset. Sorting the plurality of data transfer instructions into the plurality of transfer instruction subsets may further include, in the plurality of iterations, determining whether the first transfer instruction subset includes a plurality of conflicting data transfer instructions.

According to this aspect, when the first transfer instruction subset includes a plurality of conflicting data transfer instructions, sorting the plurality of data transfer instructions into the plurality of transfer instruction subsets may further include ranking the plurality of conflicting data transfer instructions according to respective numbers of transfer path conflicts between those conflicting data transfer instructions. The conflicting data transfer instruction that is moved to the second transfer instruction subset may be a conflicting data transfer instruction with a highest number of transfer path conflicts.

According to this aspect, at least one data transfer instruction of the plurality of data transfer instructions may be an instruction to multi-cast the data from an initiator processing area or an initiator memory buffer to a plurality of recipient processing areas.

According to another aspect of the present disclosure, a computing device is provided, including a hardware accelerator including a plurality of processing areas and a plurality of memory buffers. The computing device may further include a processor configured to perform data transfer scheduling for the hardware accelerator at least in part by receiving a plurality of data transfer instructions. The plurality of data transfer instructions may encode requests to transfer data to respective processing areas of the plurality of processing areas included in the hardware accelerator. The plurality of data transfer instructions may be received from a compiler configured to generate executable code that, when executed, causes the computing device to train a machine learning model at least in part at the hardware accelerator. Performing data transfer scheduling may further include identifying a plurality of transfer path conflicts between the plurality of data transfer instructions. Identifying the plurality of transfer path conflicts may include determining that at least two data transfer instructions of the plurality of data transfer instructions encode respective requests to concurrently transfer data along a same interconnect included in the hardware accelerator. Performing data transfer scheduling may further include sorting the plurality of data transfer instructions into a plurality of transfer instruction subsets that each include two or more data transfer instructions of the plurality of data transfer instructions. Within each transfer instruction subset, none of the two or more data transfer instructions may have transfer path conflicts with each other. For each transfer instruction subset of the plurality of transfer instruction subsets, performing data transfer scheduling may further include conveying the plurality of data transfer instructions included in that transfer instruction subset to the hardware accelerator. The plurality of data transfer instructions may be conveyed to the hardware accelerator in a plurality of sequential data transfer phases that correspond to the plurality of transfer instruction subsets.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a hardware accelerator including a plurality of processing areas and a plurality of memory buffers, wherein:
the plurality of processing areas are arranged in a plurality of processing area groups that each include three or more of the processing areas arranged in a fully connected graph;
each processing area group of the plurality of processing area groups is connected to two or more other processing area groups by a first interconnect ring and a second interconnect ring; and
the hardware accelerator is configured to multi-cast each of a plurality of entries of a first input matrix and a second input matrix to the plurality of processing area groups by transmitting respective identical copies of the entries of the first input matrix and the second input matrix from an initiator processing area or an initiator memory buffer to each of the processing area groups.

2. The computing device of claim 1, wherein the hardware accelerator is further configured to multi-cast the entries of the first input matrix and the second input matrix within each of the processing area groups subsequently to multi-casting the entries to the processing area groups.

3. The computing device of claim 2, wherein, at each of the processing areas, the hardware accelerator is configured to:
multiply a respective first sub-matrix of a first input matrix by a respective second sub-matrix of a second input matrix to compute a sub-matrix product; and
output the sub-matrix product.

4. The computing device of claim 1, wherein the hardware accelerator is further configured to:
receive data transfer instructions that encode requests to transfer data to the plurality of processing areas, wherein the data transfer instructions indicate transfer paths along which the data is configured to be transferred to the processing areas; and
multi-cast the entries of the first input matrix and the second input matrix along the data transfer paths from the initiator processing area or the initiator memory buffer to the plurality of processing area groups as specified by the data transfer instructions.

5. The computing device of claim 4, wherein:
the data transfer instructions are received in sequential batches during a respective plurality of data transfer phases; and
within each of the sequential batches, none of the data transfer instructions have transfer path conflicts.

6. The computing device of claim 4, wherein:
the hardware accelerator is configured to receive the plurality of data transfer instructions from a compiler; and
the compiler is executed at a processor and is configured to generate executable code that, when executed, causes the computing device to train a machine learning model at least in part at the hardware accelerator.

7. The computing device of claim 1, wherein the plurality of processing area groups are arranged in a processing area group topology in which each processing area group has two neighboring processing area groups.

8. The computing device of claim 1, wherein:
the hardware accelerator includes four processing area groups; and
each of the processing area groups includes four processing areas.

9. The computing device of claim 8, wherein the first interconnect ring and the second interconnect ring connect each of the processing area groups to four memory buffers.

10. A method for use with a computing device, the method comprising:
    multi-casting each of a plurality of entries of a first input matrix and a second input matrix to the plurality of processing area groups of a hardware accelerator, wherein:
        the processing area groups each include three or more processing areas that are arranged in a fully connected graph;
        each processing area group of the plurality of processing area groups is connected to two or more other processing area groups by a first interconnect ring and a second interconnect ring; and
        multi-casting the entries includes transmitting respective identical copies of the entries of the first input matrix and the second input matrix from an initiator processing area or an initiator memory buffer to each of the processing area groups;
    multi-casting the entries of the first input matrix and the second input matrix within each of the processing area groups subsequently to multi-casting the entries to the processing area groups; and
    at each of the processing areas:
        multiplying a respective first sub-matrix of a first input matrix by a respective second sub-matrix of a second input matrix to compute a sub-matrix product; and
        outputting the sub-matrix product.

11. The method of claim 10, further comprising, at the hardware accelerator:
    receiving data transfer instructions that encode requests to transfer data to the plurality of processing areas, wherein the data transfer instructions indicate transfer paths along which the data is configured to be transferred to the processing areas; and
    multi-casting the entries of the first input matrix and the second input matrix along the data transfer paths from the initiator processing area or the initiator memory buffer to the plurality of processing area groups as specified by the data transfer instructions.

12. The method of claim 11, wherein:
    the data transfer instructions are received in sequential batches during a respective plurality of data transfer phases; and
    within each of the sequential batches, none of the data transfer instructions have transfer path conflicts.

13. The method of claim 11, further comprising at the hardware accelerator:
    receiving the plurality of data transfer instructions a compiler; and
    executing the executable code to train a machine learning model.

14. The method of claim 11, wherein the plurality of processing area groups are arranged in a processing area group topology in which each processing area group has two neighboring processing area groups.

15. A computing device comprising:
    a hardware accelerator including a plurality of processing areas and a plurality of memory buffers, wherein:
        the plurality of processing areas are arranged in a plurality of processing area groups that each include three or more of the processing areas arranged in a fully connected graph; and
        the plurality of processing area groups are arranged in a processing area group topology in which each processing area group has two neighboring processing area groups; and
        the hardware accelerator is configured to multi-cast each of a plurality of entries of a first input matrix and a second input matrix to the plurality of processing area groups by transmitting respective identical copies of the entries of the first input matrix and the second input matrix from an initiator processing area or an initiator memory buffer to each of the processing area groups.

16. The computing device of claim 15, wherein:
    the hardware accelerator includes four processing area groups; and
    each of the processing area groups includes four processing areas.

17. The computing device of claim 15, wherein the hardware accelerator is further configured to multi-cast the entries of the first input matrix and the second input matrix within each of the processing area groups subsequently to multi-casting the entries to the processing area groups.

18. The computing device of claim 17, wherein, at each of the processing areas, the hardware accelerator is configured to:
    multiply a respective first sub-matrix of a first input matrix by a respective second sub-matrix of a second input matrix to compute a sub-matrix product; and
    output the sub-matrix product.

19. The computing device of claim 15, wherein the hardware accelerator is further configured to:
    receive data transfer instructions that encode requests to transfer data to the plurality of processing areas, wherein the data transfer instructions indicate transfer paths along which the data is configured to be transferred to the processing areas; and
    multi-cast the entries of the first input matrix and the second input matrix along the data transfer paths from the initiator processing area or the initiator memory buffer to the plurality of processing area groups as specified by the data transfer instructions.

20. The computing device of claim 19, wherein:
    the data transfer instructions are received in sequential batches during a respective plurality of data transfer phases; and
    within each of the sequential batches, none of the data transfer instructions have transfer path conflicts.

* * * * *